United States Patent Office 3,755,370
Patented Aug. 28, 1973

3,755,370
2-SUBSTITUTED-4-PROPARGYLOXYMETHYL-γ-BUTYROLACTONES
Claude P. Fauran, Guy M. Raynaud and Colette A. Douzon, Paris and Janine M. Thomas, Neuilly-sur-Seine, France, assignors to Delalande S.A., Courbevoie, France
No Drawing. Filed Aug. 22, 1969, Ser. No. 852,476
Claims priority, application Great Britain, Sept. 17, 1968, 44,027
Int. Cl. C07d 5/06
U.S. Cl. 260—343.6                    4 Claims

ABSTRACT OF THE DISCLOSURE

A compound of the formula:

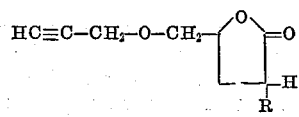

in which R is hydrogen, alkyl having 1 to 10 carbon atoms or aryl aliphatic in which the aryl can be substituted by one or more halogens, one or more alkoxy, aliphatic having 1 to 4 carbon atoms or trifluoromethyl. The compound is formed by saponifying and then decarboxylating the corresponding 2-ethoxycarbonyl derivative. The compounds possess anxiolytic, anti-depressive, analgesic and respiratory stimulating properties.

---

The present invention concerns new 4-propargyloxymethyl-γ-butyrolactones, their process of preparation, and their therapeutic application.

The compounds according to the present invention correspond to the General Formula I

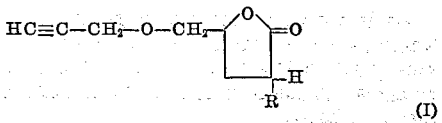

in which R represents a hydrogen atom, an alkyl chain having 1 to 10 carbon atoms, or an arylaliphatic radical, the aryl part of which being optionally substituted by one or more halogen atoms, one or more alkoxy radicals, an aliphatic radical having 1 to 4 carbon atoms or a trifluoromethyl radical.

The process according to the present invention comprises saponifying and then decarboxylating a 4-propargyloxymethyl-2-ethoxycarbonyl - γ - butyrolactone of the Formula II

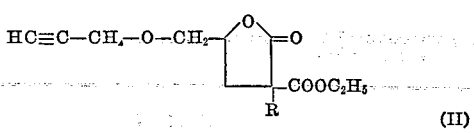

in which R has the same significance as in Formula I.

The following preparations are given as non-limitative examples to illustrate the present invention.

EXAMPLE 1

4-propargyloxymethyl-γ-butyrolactone

To a 20% soda solution heated to 35° C., there is progressively introduced, with agitation, 34 g. of 4-propargyloxymethyl - 2 - ethoxycarbonyl - γ - butyrolactone whilst avoiding an increase in temperature to above 40° C. When the dissolution is complete, the mixture is cooled and acidified with dilute hydrochloric acid. The oily product salting out is extracted with ether. The residue obtained by concentration is heated to 100° C. and then distilled under reduced pressure.

Boiling point=135° C. under 0.1 mm. Hg
Yield=50%

*Elementary analysis.*—Calculated (percent: C, 62.32; H, 6.54. Found (percent): C, 62.12; H, 6.64.

EXAMPLE 2

4-proparglyoxymethyl-2-methyl-γ-butyrolactone

To a 20% soda solution heated to 40° C. there is progressively introduced 36 g. of 4-propargyloxymethyl-2-methyl-2-ethoxycarbonyl-γ-butyrolactone. In order to obtain complete saponification of the product, the temperature may be raised to 70° C. for several minutes. After cooling, the mixture is acidified with hydrochloric acid and heated at 90° C. for 3 hours. The temperature of the mixture is then returned to normal, and the mixture is then extracted with ether. The organic phase is decanted and concentrated, and the resulting residue is purified by distillation.

Boiling point=130° C. under 0.1 mm. Hg
Yield=76%

*Elementary analysis.*—Calculated (percent): C, 64.27; H, 7.19. Found (percent): C, 64.11; H, 7.39.

EXAMPLE 3

4-propargyloxymethyl-2-n-butyl-γ-butyrolactone

This compound is obtained according to the procedure described in Example 1 except that 4-propargyloxymethyl-2-n-butyl-2-ethoxycarbonyl - γ - butyrolactone is used instead of 4-propargyloxymethyl-2-ethoxycarbonyl-γ-butyrolactone.

Boiling point=155° C. under 0.05 mm. Hg
Yield=90%

*Elementary analysis.*—Calculated (percent): C, 68.54; H, 8.63. Found (percent): C, 68.56; H, 8.58.

EXAMPLE 4

4-propargyloxymethyl-2-benzyl-γ-butyrolactone

To a 10% soda solution heated to 80° C. there is introduced 31 g. of 4 - propargyloxymethyl - 2 - benzyl-2-ethoxycarbonyl-γ-butyrolactone. After 45 minutes of contact at the same temperature with agitation, the mixture is cooled and then acidified with hydrochloric acid. The organic product salting out is extracted with ether. After decantation and concentration of the organic phase, the product obtained is heated to 100° C. until the evolution of carbon dioxide gas has ceased. The product is then distilled under reduced pressure.

Boiling point=165–170° C. under 0.04 mm. Hg
Yield=73%

*Elementary analysis.*—Calculated (percent): C, 73.75; H, 6.60. Found (percent): C, 73.78; H, 6.75.

EXAMPLE 5

4-propargyloxymethyl-2-p-chlorobenzyl-γ-butyrolactone

This compound is obtained according to the procedure described in Example 4 except that 4-propargyloxymethyl-2-p-chlorobenzyl-2-ethoxycarbonyl - γ - butyrolactone is used.

Boiling point=195–200° C. under 0.03 mm. Hg
Yield=70%

*Elementary analysis.*—Calculated (percent): C, 64.63; H, 5.42; Cl, 12.72. Found (percent): C, 64.51; H, 5.29; Cl, 12.55.

EXAMPLE 6

4-propargyloxymethyl-2-p-methoxybenzyl-γ-butyrolactone

This compound is obtained according to the procedure described in Example 4 except that 4-propargyloxymethyl-2-p-methoxybenzyl-2-ethoxycarbonyl - γ - butyrolactone is used.

Boiling point=205° C. under 0.2 mm. Hg
Yield=63%

*Elementary analysis.*—Calculated (percent): C, 70.05; H, 6.61. Found (percent): C, 70.09; H, 6.85.

EXAMPLE 7

4-propargyloxymethyl-2-p-fluorobenzyl-γ-butyrolactone

This compound is obtained according to the procedure described in Example 4 except that 4-propargyloxymethyl-2-p-fluorobenzyl-2-ethoxycarbonyl-γ-butyrolactone is used.

Boiling point=185°–190° C. under 0.06 mm. Hg
Yield=83%

*Elementary analysis.*—Calculated (percent): C, 68.69; H, 5.77. Found (percent): C, 68.49; H, 5.88.

The compounds according to the present invention have been studied on animals in the laboratory and have been shown to possess, in particular, anxiolytic, anti-depressive, analgesic and respiratory stimulating properties.

(1) Anxiolytic properties

The oral administration of the compounds of the General Formula I according to the present invention exercise an opposite antagonism to the mortal convulsions provoked by the injection of pentetradol or strychnine in mice, an improvement in the performance of mice in the electric shock test having an enclosure surrounded by four electrically conductive plates and an increase in the motivity measured in mice by an actimeter having a pencil of rays and photo-electric cells or by the evasion test on an inclined plane, or, in rats in open field with appraisement of crossed furrows and the number of setting up of the animal.

The results obtained with a certain number of compounds in accordance with the invention are shown in Table I below:

TABLE I

| R | Protection against— | | Electric shock test | Motivity at— | | | |
|---|---|---|---|---|---|---|---|
| | Pentetrazol | Strychnine | | Actimetric | Evasion | Increase in the number of— | |
| | | | | | | Setting up | Crossed furrows |
| —CH₂— 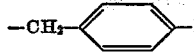 | Effect: 50% at 230 mg./kg. | Effect: 50% at 33 mg./kg. | Increase of 70% at 100 mg./kg. | Increase of 40% at 100 mg./kg. | Increase of 70% at 200 mg./kg. | 30% at 200 mg./kg. | 40% at 200 mg./kg. |
| —CH₂— 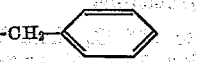 —Cl | | | | | Increase of 30% at 200 mg./kg. | | |
| —CH₂— 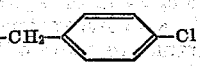 —F | Effect: 50% at 160 mg./kg. | | | | Increase of 65% at 200 mg./kg. | | |

(2) Anti-depressive properties

The oral administration of the compounds of General Formula I causes a notable reduction of the ptosis and hypothermia caused by reserpine in mice and gastric ulcers caused by the same compound in rats.

For example, the results obtained with 4-propargyloxymethyl-2-benyl-γ-butyrolactone are as follows:

At 100 mg./kg./p.o., this compound inhibits the ptosic and hypothermic effects caused by reserpine in mice, and at 105 mg./kg./p.o., it protects 50% of the rats against the ulcerogenic action of this compound.

(3) Analgesic properties

These properties shown themselves by an inhibition of the painful stretchings provoked by the inter-peritoneal injection of acetic acid in mice.

By way of example, the results obtained with three of the compounds of general Formula I are given in Table II below:

TABLE II

| R | Dose administered, mg./kg./P.O. | Protection, percent |
|---|---|---|
| H | 100 | 50 |
| —CH₂—  —Cl | 100 | 35 |
| —CH₂— 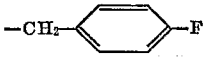 —F | 100 | 40 |

(4) Stimulant properties

In the anaesthetised guinea-pig, whose respiration has been depressed by an intravenous injection of morphine, the administration of the compounds of General Formula I exerts a favourable effect on the respiratory rhythm and amplitude.

For example, the results obtained with two of the compounds of General Formula I are given in Table III below:

TABLE III

| R | Dose administered, mg./kg./I.V. | Increase in respiratory rhythm, percent | Increase in respiratory amplitude, percent |
|---|---|---|---|
| —n—C₄H₉ | 10 | 130 | 40 |
| | 20 | 160 | 90 |
| —CH₂—  —Cl | 10 | 70 | |

As is shown by the results given above and those of Table IV below, the difference between the pharmacologically active dose and the lethal dose is sufficiently great to allow the compounds of General Formula I to be used therapeutically.

TABLE IV

| R | Animal | Dose administered (orally), mg./kg. | Mortality, percent |
|---|---|---|---|
| H | Mouse | 3.000 | 50 |
| —n—C₄H₉ | do | 1.700 | 50 |
| —CH₂—  | do | 1.000 | 50 |
| | Rat | 2.400 | 50 |
| —CH₂—  —Cl | Mouse | 3.000 | 0 |
| —CH₂— 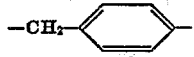 —F | do | 1.800 | 50 |

The compounds of General Formula I are administered to treat anxiety neuroses, depressive syndromes, pains and aches of different sorts and respiratory insufficiencies.

They are given in the form of tablets and suppositories containing 25 to 100 mg. of active ingredient, drops and syrups containing 1% to 10% of active ingredient or injectable ampoules containing 10 to 200 mg. of active ingredient.

The starting materials for the processes described above can be prepared by the processes described in U.S. patent applications Ser. No. 851,757, filed Aug. 20, 1969, by Claude P. Fauran, Guy M. Raynaud, Colette A. Douzon and Claude J. Gouret, now U.S. Pat. No. 3,663,572 and Ser. No. 852,086, filed Aug. 21, 1969, by Claude P. Fauran, Guy M. Raynaud, Colette A. Douzon and Bernard M. Pourrias, now U.S. Pat. No. 3,665,014.

What we claim is:

1. A compound of the formula:

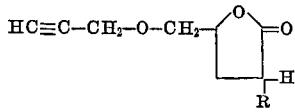

in which R is selected from the group consisting of hydrogen, alkyl of the formula $C_nH_{2n+1}$ in which $n$ is from 1 to 4, benzyl, and substituted benzyl in which the benzene ring has a substituent selected from the group consisting of halogen and lower methoxy.

2. A compound as defined in claim 1, in which R is hydrogen.

3. A compound as defined in claim 1, in which R is methyl or n-butyl.

4. A compound as defined in claim 1, in which R is benzyl, p-chlorobenzyl, p-methoxybenzyl or p-fluorobenzyl.

References Cited

Wagner and Zook: Synthetic Organic Chemistry, Wiley and Sons, N.Y., 1953, pp. 416–417 and 838 relied on.

DONALD G. DAUS, Primary Examiner

A. M. T. TIGHE, Assistant Examiner

U.S. Cl. X.R.

424—279

UNITED STATES PATENT OFFICE
CERTIFICATE OF CORRECTION

Patent No. 3,755,370     Dated August 28, 1973

Inventor(s) Claude P. Fauran, Guy M. Raynaud, Colette A. Douzon and Janine M. Thomas It is certified that error appears in the above-identified patent and that said Letters Patent are hereby corrected as shown below:

Column 6, line 5; before "methoxy", delete ---lower---.

Signed and sealed this 19th day of February 1974.

(SEAL)
Attest:

EDWARD M. FLETCHER, JR.
Attesting Officer

C. MARSHALL DANN
Commissioner of Patents